Oct. 24, 1933.      J. C. McCUNE      1,932,081
SAFETY CONTROL EQUIPMENT
Filed April 2, 1930
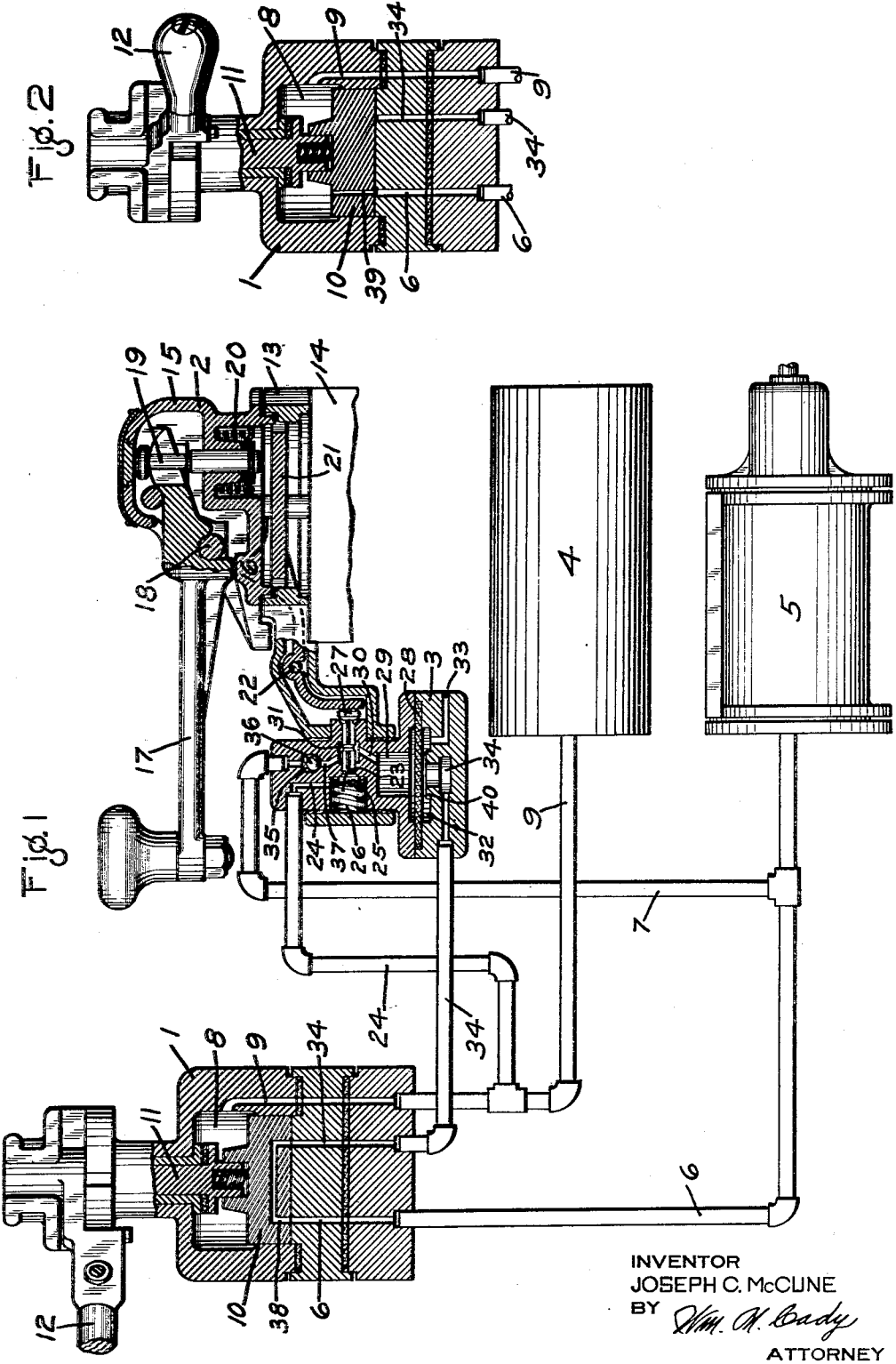
INVENTOR
JOSEPH C. McCUNE
BY *Wm. N. Cady*
ATTORNEY Patented Oct. 24, 1933

1,932,081

UNITED STATES PATENT OFFICE 1,932,081

SAFETY CONTROL EQUIPMENT

Joseph C. McCune, Edgewood, Pa., assignor to The Westinghouse Air Brake Company, Wilmerding, Pa., a corporation of Pennsylvania Application April 2, 1930. Serial No. 440,947

7 Claims. (Cl. 303—19)

This invention relates to fluid pressure brakes and more particularly to safety car control equipment.

The principal object of my invention is to provide a straight air brake equipment having novel means operative automatically to effect an application of the brakes in the event of the incapacitation of the operator.

Another object of my invention is to provide a straight air brake equipment having means operative upon the release of the car motor controller handle for effecting an application of the brakes.

A further object of my invention is to provide a straight air brake having a valve mechanism which is operative upon the release of the car motor controller handle to supply fluid under pressure from a main reservoir to the straight air pipe for effecting an application of the brakes.

Other objects and advantages will appear in the following more detailed description of the invention.

In the drawing; Fig. 1 is a diagrammatic view, mainly in section, of a safety car control equipment embodying my invention, the several parts of the equipment being shown in running positions; and Fig. 2 is view, partly in section and partly in elevation, of the brake valve device in application position.

As shown in the drawing, the safety car control equipment may comprise a brake valve device 1, a safety controller handle device 2, a pilot valve device 3, a main reservoir 4, a brake cylinder 5, a straight air pipe 6, and a safety control pipe 7.

The brake valve device 1 may comprise a casing having a chamber 8 constantly connected to the main reservoir 4 through a main reservoir pipe and passage 9 and contains a rotary valve 10 which is operatively connected to an operating stem 11 rotatably mounted in the casing, said stem having an operating handle 12 removably mounted thereon.

The controller handle device 2 may comprise a bracket 13 which is rigidly mounted on the car motor controller 14 and also comprises a casing 15 which is mounted on the upper end of the usual controller operating shaft 16 and which is rotatable relative to the bracket 13.

For the purpose of rotating the casing 15 and thereby the controller shaft 16, a removable handle 17 is provided which, intermediate its ends, is pivotally mounted on a pin 18 mounted in the casing 15. The inner end of this handle is adapted to engage the under side of the head of a plunger pin 19 which is acted upon by a spring 20 and when released is adapted to engage the inner end portion of a lever 21 which, intermediate its ends, is pivotally mounted on a pin 22 secured to the bracket 13. The outer end of this lever 21, as hereinafter more fully described, is adapted to cooperate with the pilot valve device 3.

The pilot valve device 3 may comprise a casing which in the present embodiment of the invention is carried by the bracket 13. This casing has a chamber 23 which is constantly connected to the main reservoir pipe 9 through a pipe and passage 24 and contains a fluid pressure supply valve 25 which is constantly subject to the pressure of a spring 26 also contained in the chamber 23. The valve 25 is provided with a fluted stem which is adapted to engage the end of the fluted stem of a fluid pressure vent valve 27.

Mounted in the casing is a flexible diaphragm 28. The chamber 29 at one side of this diaphragm is constantly connected through a passage 30 to a chamber 31 which is located between the valves 25 and 27. With the controller handle maintained depressed as shown in Fig. 1, the pressure of the spring 26 maintains the valve 25 seated and the valve 27 unseated. With the valve 27 unseated the chamber 31 and consequently the chamber 29 are connected to the atmosphere.

The chamber 32 at the other side of the flexible diaphragm 28 is constantly connected to the atmosphere through a passage 33 and when the diaphragm is in the position shown in Fig. 1 has a brake cylinder exhaust pipe and passage 34, leading from the brake valve device 1, connected thereto.

The casing of the pilot valve device also has a chamber 35 which is constantly connected to the safety control pipe 7 and contains a ball check valve 36 which is adapted to close communication through a passage 37 leading to the chamber 31, thus preventing the back flow of fluid under pressure from the straight air pipe and control pipe and passage to the chamber 31.

With the brake valve device 1 in release position and the controller handle 17 maintained depressed, the rotary valve chamber 8 in the brake valve device 1 and the chamber 23 in the pilot valve device 3 are charged with fluid under pressure from the main reservoir 4 and the brake cylinder 5 is connected to atmosphere through the straight air pipe and passage 6, a cavity 38 in the rotary valve 10, passages and pipe 34, diaphragm chamber 32 in the pilot valve device 3 and passage 33.

Should the operator desire to effect an application of the brakes, he maintains the controller handle depressed, and through the medium of the operating handle 12 moves the rotary valve 10 of the brake valve device to application position as shown in Fig. 2, in which position the exhaust passage 34 is lapped by the rotary valve and fluid under pressure from the rotary valve chamber 8, as supplied from the main reservoir 4 through pipe and passage 9, flows to the brake cylinder 5 through a port 39 in the rotary valve 10 and straight air passage and pipe 6. Fluid under pressure supplied to the pipe 6 also flows to the chamber 35 in the pilot valve device 3 through the safety control pipe and passage 7, but the ball check valve 36 will prevent the flow of fluid from this chamber to the atmosphere through passage 37, chamber 31 and past the unseated vent valve 27, so that in effecting a straight air application of the brakes, fluid under pressure supplied to the brake cylinder cannot escape to the atmosphere by way of the pilot valve device.

To release the brakes, the operator by the use of the handle 12 returns the rotary valve 10 of the brake valve device to release position, in which the supply of fluid under pressure to the brake cylinder is closed off and the brake cylinder is connected to atmosphere as before described.

If, at any time and for any reason, the operator should remove his hand from the controller handle 17, the plunger pin 19 is actuated by the spring 20, so as to engage the lever 21, which lever is then operated, through the medium of the pin, to cause the exhaust valve 27 to be seated and the supply valve to be unseated against the pressure of the spring 26. With the vent valve 27 thus seated, the atmospheric communication from the diaphragm chamber 29 is closed off and with the supply valve unseated, fluid under pressure from the supply valve chamber 23, as supplied from the main reservoir 4 through the main reservoir pipe 9 and pipe and passage 24, flows to the chamber 31 and from thence through passage 30 to the chamber 29. The pressure of fluid thus supplied to the chamber 29 causes the diaphragm 28 to flex downwardly so that the under side thereof will seat against seat ring 40 so as to form a tight seal which will prevent the flow of fluid from the passage 34 to the chamber 32.

If the brake valve device should be in release position when the operator's hand is removed from the controller handle 17 and the pilot valve device has been operated as just described, fluid under pressure supplied to the chamber 31 flows to the brake cylinder 5 through passage 37, past the ball check valve 36 to the chamber 35 and from thence through the safety control pipe 7 and straight air pipe 6. Fluid under pressure thus supplied to the straight air pipe will also flow to the passage 34 in the pilot valve device 3 by way of the cavity 38 in the rotary valve 10 of the brake valve device and passage and pipe 34, but since the diaphragm is seated against the seat ring 40, fluid under pressure is not permitted to flow from the passage 34 to the diaphragm chamber 32. It will here be noted that since the upper side of the diaphragm is subjected, over a large area, to fluid under pressure in the chamber 29 and the under side is subjected, over a much smaller area, to fluid under pressure at substantially the same pressure, the pressure of fluid in the passage 34 and acting on the under side of the diaphragm will not cause the diaphragm to flex upwardly away from its seat ring 40, so that as long as the supply valve 25 is unseated, the atmospheric connection from the brake cylinder is maintained closed.

To release the brakes after such an automatic application of the brakes, the operator depresses the controller handle, actuating the plunger pin 19 upwardly against the pressure of the spring 20 out of operative engagement with the lever 21. As the pin 19 is thus actuated, the pressure of the spring 26 of the pilot valve device causes the supply valve to be seated, closing off the further supply of fluid under pressure to the brake cylinder and diaphragm chamber 29, and also causes the vent valve 27 to be unseated, establishing communication through which fluid under pressure from the chamber 29 is vented to the atmosphere. Since the outer end of the lever 21 is in engagement with the vent valve 27, said lever will be moved to its normal position as shown in Fig. 1. When fluid under pressure is thus vented to the atmosphere, the pressure of fluid at brake cylinder pressure, acting on the under side of the diaphragm, causes the diaphragm to be flexed upwardly from its seat ring 40, so that fluid under pressure is discharged from the brake cylinder 5 through the straight air pipe and passage 6, cavity 38 in the rotary valve 10, passages and pipe 34, diaphragm chamber 32 in the pilot valve device 3 and passage 33.

Should the operator remove his hand from the controller handle when a partial application of the brakes has been effected and the brake valve device 1 is in lap position, the controller handle device 2 and pilot valve device will operate to effect an application of the brakes in the same manner as before described, the fluid under pressure supplied to the chamber 31 in the pilot valve device and flowing through the passage 37 raising the ball check valve 36 from its seat against the brake cylinder pressure present in the chamber 35 and flowing to the brake cylinder 5 through the safety control pipe 7 and straight air pipe 6, thus ensuring a full application of the brakes. Before such an application of the brakes can be released, the controller handle must be depressed and the brake valve device operated to release position.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a safety car control equipment, the combination with a brake cylinder, of a controller handle device comprising a handle, a valve device normally establishing communication through which the brake cylinder is connected to the atmosphere and operative by said handle device upon the release of said handle to supply fluid under pressure to the brake cylinder, and means subject to the pressure of fluid supplied to the brake cylinder for closing the communication from the brake cylinder to the atmosphere.

2. In a safety car control equipment, the combination with a brake cylinder, of a controller handle device comprising a handle, a valve device normally establishing communication through which the brake cylinder is connected to the atmosphere and operative by said handle device upon the release of said handle to supply fluid under pressure to the brake cylinder, and means included in said valve device and subject to the pressure of fluid being supplied to the brake cylinder for closing the communication from the brake cylinder to the atmosphere.

3. In a safety car control equipment, the combination with a brake cylinder, of a controller handle device comprising a handle, a valve device normally establishing communication through which the brake cylinder is connected to the atmosphere and operative upon the release of said handle to supply fluid under pressure to the brake cylinder, and a flexible diaphragm subject on one side to the pressure of fluid supplied to the brake cylinder for closing the communication from the brake cylinder to the atmosphere.

4. In a safety car control equipment, the combination with a brake cylinder, of a controller handle device comprising a handle, a valve device normally establishing communication through which the brake cylinder is connected to the atmosphere and operative upon the release of said handle to supply fluid under pressure to the brake cylinder, means subject to the pressure of fluid supplied to the brake cylinder for closing the communication from the brake cylinder to the atmosphere and operative upon the venting of fluid acting thereon for opening the communication from the brake cylinder to the atmosphere, and a vent valve operative by said controller handle device upon the depression of the handle thereof for venting the fluid under pressure acting on said means.

5. In a safety car control equipment, the combination with a brake cylinder, of a controller handle device comprising a handle, a valve device normally establishing communication through which the brake cylinder is connected to the atmosphere and operative upon the release of said handle to supply fluid under pressure to the brake cylinder, means subject to the pressure of fluid supplied to the brake cylinder for closing the communication from the brake cylinder to the atmosphere and operative upon the venting of fluid acting thereon for opening the communication from the brake cylinder to the atmosphere, a vent valve operative by said controller handle device upon the depression of the handle thereof for venting the fluid under pressure acting on said means, and a check valve preventing the back flow of fluid under pressure from the brake cylinder to the atmosphere past the vent valve.

6. The combination with a straight air brake equipment comprising a brake cylinder, a main reservoir, a straight air pipe through which fluid under pressure is supplied to and released from the brake cylinder and a brake valve device having an application position in which fluid under pressure is supplied from the main reservoir to the straight air pipe to effect an application of the brakes and a release position in which communication is established through which fluid under pressure is released from the straight air pipe to effect a release of the brakes, of a controller handle, and means operative upon the release of said handle for supplying fluid under pressure from the main reservoir to the straight air pipe to effect an application of the brakes, and means responsive to the pressure of fluid supplied from the main reservoir to the straight air pipe for preventing the flow of fluid from said straight air pipe when the brake valve device is in release position.

7. In a fluid pressure brake, the combination with a brake cylnder, a straight air pipe through which fluid under pressure is supplied to and released from the brake cylinder and a controller handle mechanism, of a manually operative valve and a valve mechanism normally establishing communication through which the straight air pipe is connected to the atmosphere and a valve device operable by said mechanism upon the release of the handle of the mechanism for closing said communication and for supplying fluid under pressure to the straight air pipe to effect an application of the brakes and operative upon the depression of said handle for opening said communication.

JOSEPH C. McCUNE.